United States Patent [19]

Makuch et al.

[11] 4,339,171
[45] Jul. 13, 1982

[54] FIBER OPTIC CABLE RETAINER MEMBER

[75] Inventors: John A. Makuch, Danbury; Kevin J. Monaghan, Middlebury, both of Conn.

[73] Assignee: Bunker Ramo Corporation, Oak Brook, Ill.

[21] Appl. No.: 127,191

[22] Filed: Mar. 4, 1980

Related U.S. Application Data

[62] Division of Ser. No. 879,186, Feb. 21, 1978.

[51] Int. Cl.³ .............................................. G02B 5/14
[52] U.S. Cl. ................................. 350/96.20
[58] Field of Search ............... 350/96.20, 96.21, 96.22; 339/103 R, 103 B, 103 M, 104

[56] References Cited

U.S. PATENT DOCUMENTS

| | | | |
|---|---|---|---|
| 3,076,169 | 1/1963 | Blaisdell | 339/103 R X |
| 3,116,361 | 12/1963 | Bentz et al. | 339/103 M X |
| 3,136,843 | 6/1964 | Pomerantz et al. | 339/103 R X |
| 3,197,730 | 7/1965 | Hargett | 339/103 M X |
| 3,870,396 | 3/1975 | Racki et al. | 350/96.16 |
| 3,917,383 | 11/1975 | Cook et al. | 350/96.22 |
| 3,923,371 | 12/1975 | Dalgleish | 350/96.21 |
| 3,982,060 | 9/1976 | Avery et al. | 174/75 C |
| 4,009,931 | 3/1977 | Malsby et al. | 350/96.21 |
| 4,047,797 | 9/1977 | Arnold et al. | 350/96.20 |
| 4,155,624 | 5/1979 | Logan et al. | 350/96.21 |
| 4,168,109 | 9/1979 | Dumire | 350/96.21 |
| 4,183,619 | 1/1980 | Makuch | 350/96.21 |
| 4,190,316 | 2/1980 | Malsby et al. | 350/96.21 X |
| 4,190,317 | 2/1980 | Makuch | 350/96.20 |
| 4,217,028 | 8/1980 | Reh et al. | 350/96.20 |

FOREIGN PATENT DOCUMENTS

| | | | |
|---|---|---|---|
| 2522740 | 12/1976 | Fed. Rep. of Germany | 350/96.21 |
| 2316611 | 1/1977 | France | 350/96.21 |

OTHER PUBLICATIONS

"Fiber-Optic Cable Getting Connector for Use in Field", *Electronics*, vol. 48, No. 17, Aug. 1975, pp. 29-30.

*Primary Examiner*—John K. Corbin
*Assistant Examiner*—John D. Lee
*Attorney, Agent, or Firm*—F. M. Arbuckle; J. R. Hoffman

[57] ABSTRACT

A hermaphroditic fiber optic connector for use in an assembly for aligning mating ends of at least one pair of optical fibers is disclosed. The connector includes a terminating member having a passage therein dimensioned for receiving one of the optical fibers. An adapter associated with a mating end of the terminating member and communicating with the passage is provided wherein the adapter has a hermaphroditic face exposed at the mating end of the terminating member. The connector also includes means associated with the adapter for securing the one optical fiber in a preselected position relative to the mating end of the terminating member. In a more specific sense, the connector is adapted for use in an assembly including a second identical connector for aligning mating ends of optical fibers in a pair of fiber optic cables in which the various elements may be formed in a manner making them interchangeable with other like elements in order to form a modular hermaphroditic connector.

2 Claims, 16 Drawing Figures

FIBER OPTIC CABLE RETAINER MEMBER

This is a divisional application of application Ser. No. 879,186, filed Feb. 21, 1978.

BACKGROUND OF THE INVENTION

The present invention relates to fiber optic connectors and, more particularly, to hermaphroditic fiber optic connectors for use in an assembly for aligning mating ends of optical fibers in a pair of fiber optic cables.

In recent years, fiber optic communication lines made up of parallel optically-conductive fibers arranged to form a flexible cable for conveying light from one location to another have come into increasing use. The applications have varied, although one particularly significant application has been conveying data from one location to another by modulating a light source with data to be transmitted at one end of the cable and recovering the data at the other end of the cable with a photosensitive detector. Since the data is conveyed by a medium not subject to radio frequency interference or detection, fiber optic communication lines are particularly well adapted for applications requiring a high degree of security like those found in the data processing field.

With the increasing use of fiber optic communication lines, the need has developed for connectors capable of joining segments of cables with minimum detriment to the optical transmission path. It has been found that precise axial and angular alignment between a pair of fiber optic cables can be achieved by terminating the optical fibers of the cables in connector pin assemblies in such a way that the optical fibers are concentrically aligned with respect to the outer dimension of the connector pins. When a pair of connector pins are concentrically aligned, the ultimate result is that the optical fibers will likewise be angularly and axially aligned for efficient light transfer.

While the connector art has been developing, the primary focus has been upon connectors having male and female components. More recently, there has been a growing interest in, and recognition of the need for, developing a suitable hermaphroditic fiber optic connector for use in an assembly including a second identical hermaphroditic fiber optic connector for aligning mating ends of optical fibers in a pair of fiber optic cables. Understandably, this interest has developed out of an appreciation for the fact that hermaphroditic connectors would eliminate the problem of assuring proper selection of both male and female connectors for a particular assembly as well as an appreciation for the commensurately reduced manufacturing and assembly costs. More particularly, there has been an increasing awareness of the need for development of a multichannel hermaphroditic fiber optic connector for use with single-fiber-per-channel strengthened cables. Additionally, a hermaphroditic fiber optic connector has been sought which exhibits low loss characteristics just as with prior art fiber optic connectors.

Although the advantages of a hermaphroditic fiber optic connector have been appreciated, the need has remained for a practical embodiment adapted for use in an assembly including a second identical embodiment. Prior art connectors have apparently failed to disclose or suggest a hermaphroditic connector of the type contemplated. This is perhaps best illustrated by U.S. Pat. Nos. 3,870,396 and 3,398,388 which perhaps represent some of the more pertinent prior art. Prior art connectors such as those disclosed in these patents nevertheless have only a remote relationship at best to a hermaphroditic fiber optic connector of the type contemplated. Accordingly, a practical hermaphroditic fiber optic connector embodiment has never before been available even though the problems associated with assemblies using male and female connectors have long been known and appreciated.

As a result, a hermaphroditic fiber optic connector has been needed for use in an assembly including a second identical hermaphroditic fiber optic connector for aligning mating ends of at least one pair of optical fibers in a pair of fiber optic cables.

SUMMARY OF THE INVENTION

Accordingly, the present invention, in its broadest sense, is directed to a hermaphroditic fiber optic connector for use in an assembly for aligning mating ends of at least one pair of optical fibers. The connector includes a terminating member having a passage therein dimensioned for receiving one of the optical fibers. Adapter means associated with a mating end of the terminating member and communicating with the passage is provided wherein the adapter means has a hermaphroditic face exposed at the mating end of the terminating member. The connector also includes means associated with the adapter means for securing the one optical fiber in a preselected position relative to the mating end of the terminating member.

More specifically, the present invention is directed to a hermaphroditic fiber optic connector for use in an assembly including a second identical hermaphroditic fiber optic connector for aligning mating ends of optical fibers in a pair of fiber optic cables. The connector then includes a rigid terminating member having a first bore dimensioned for receiving one of the fiber optic cables and communicating with a second bore in a mating end of the rigid terminating member. An adapter is supported in the second bore wherein the adapter has a hermaphroditic face exposed at the mating end of the rigid terminating member and a plurality of spaced optical fiber receiving bores are included in the adapter for receiving the optical fibers of the one fiber optic cable. The connector then also includes means associated with the optical fiber receiving bores for securing the optical fibers of the one fiber optical cable in preselected positions relative to the mating end of the rigid terminating member.

In this embodiment, the second bore is preferably concentric with the first bore and the first bore is smaller in diameter than the diameter of the second bore. The first and second bores advantageously extend longitudinally through the rigid terminating member. Additionally, the adapter is cylindrical and has a diameter equal to the diameter of the second bore.

The hermaphroditic face preferably includes a planar surface disposed at an angle to a plane defined by the mating end of the rigid terminating member. The planar surface includes a first portion recessed within the second bore and a second portion extending beyond the mating end of the rigid terminating member. While the arrangement may be altered, the planar surface is preferably bisected by the plane defined by the mating end of the rigid terminating member.

Additional features of this embodiment include the adapter having a hollow sleeve dimensioned to fit within the second bore wherein the sleeve supports an insert having the hermaphroditic face formed on one end thereof. The sleeve is advantageously cylindrical having a diameter equal to the diameter of the second bore with the inner diameter thereof being equal to the outer diameter of the insert. The adapter also preferably includes an inwardly projecting lip at the end of the sleeve opposite the mating end of the rigid terminating member to serve as a stop for the insert.

The hermaphroditic face can alternatively include a planar surface lying in a plane defined by the mating end of the rigid terminating member. In this form, the planar surface will advantageously include means for aligning and constraining the hermaphroditic face against longitudinal, transverse and rotational movement relative to a hermaphroditic face of a second identical hermaphroditic connector. The means for aligning and constraining the hermaphroditic face preferably includes a pin and a pin receiving slot spaced apart about the perimeter of the major planar surface.

The hermaphroditic face can further include first and second planar surfaces lying in separate planes parallel to a plane defined by the mating end of the rigid terminating member. In this form, one of the planar surfaces can advantageously lie beyond the plane defined by the mating end of the rigid terminating member with the other of the planar surfaces lying in a plane recessed within the second bore. The first and second planar surfaces are preferably joined by an alignment surface lying in a plane generally perpendicular to the first and second planar surfaces.

Still additional features of this embodiment include strain relief means with the one fiber optic cable having strength members extending longitudinally of the optical fibers about the periphery thereof to protect the optical fibers by resisting longitudinal and transverse loading. More specifically, the rigid terminating member will include strength member retainer means for securing forward ends of the strength members against rearward movement relative to the rigid terminating member. It is desirable for the strength member retainer means to include an annular groove concentric with the first bore wherein the groove has a smoothly rounded inner end and cooperates with an annular plug having a rounded forward end so that the plug may tightly confine forward ends of the strength members within the groove. The plug can advantageously be held within the groove by releasable securing means engaging the rearward end of the plug to urge the plug further into the groove.

The one fiber optic cable will also preferably include additional strain relief means with the cable having an outer jacket extending longitudinally of the strength members about the periphery thereof to provide environmental protection for the optical fibers. More specifically, the rigid terminating member will then advantageously include jacket retainer means for securing a forward end of the outer jacket against rearward movement relative to the rigid terminating member. It is desirable for the outer jacket retainer means to include a shoulder at one end and a barb at the other end with the shoulder being confined between the plug and the releasable securing means and the barb bitingly engaging the outer jacket. The releasable securing means is preferably a hollow nut threadingly engaged with the rigid terminating member with the outer jacket being confined between the inner surface of the hollow nut and the outer surface of the outer jacket retainer means.

The hollow nut is also externally threaded and includes longitudinally extending slots at the rearward end thereof so as to cooperate with an internally threaded nut of decreasing diameter to compress the rearward end thereof. With these features of construction, the compressed rearward end of the hollow nut defines a second barb bitingly engaging the outer jacket for securing the outer jacket against forward movement relative to the rigid terminating member.

With another type of fiber optic cable, the strength members may extend longitudinally of the optical fibers through the center thereof in which case the rigid terminating member will again include means for holding the strength members against rearward movement relative to the rigid terminating member. In this case, the rigid terminating member desirably includes an intermediate bore between the first and second bores having a cylindrical plug disposed therein with the plug having a plurality of circumferentially spaced slots supporting the optical fibers intermediate the first and second bores in substantial alignment with the optical fiber receiving bores in the adapter. Moreover, the cylindrical plug will include a tapered opening through the center thereof receiving forward ends of the strength members and cooperating with a tapered plug inserted therein to tightly confine forward ends of the strength members within the tapered opening.

Still further additional features of this embodiment include optical fiber securing means having a plurality of pin members associated with each of the optical fiber receiving bores in side-by-side relation with the pin members being of equal dimension and dimensioned for substantially tangential contact with each other and with the inner wall of the optical fiber receiving bore. The pin members are also advantageously in substantial tangential contact with the optical fiber for tightly confining the optical fiber in the preselected position relative to the mating end of the rigid terminating member and further include adhesive material between the pin members and the inner wall of the optical fiber receiving bore and between the pin members and the outer surface of the optical fiber. Alternatively, the optical fiber securing means includes compressible insert members each having an outer dimension greater than the dimension of the optical fiber receiving bores and a central aperture dimensioned for receiving one of the optical fibers and being adapted for forced insertion into each of the optical fiber receiving bores wherein the compressible insert member is substantially uniformly compressed by the optical fiber receiving bore for substantially uniformly reducing the dimension of the central aperture about the optical fiber to thereby tightly confine the optical fiber in the preselected position relative to the mating end of the rigid terminating member.

Additionally, the present invention, in another important sense, is directed to a modular hermaphroditic connector for use in a fiber optic connector assembly for aligning mating ends of optical fibers in a pair of fiber optic cables. The modular connector includes a terminating member having a first bore dimensioned for receiving one of the fiber optic cables and communicating with a second bore in a mating end of the rigid terminating member. Adapter means associated with the second bore is provided having a hermaphroditic face exposed at the mating end of the rigid terminating member and being interchangeable with other adapter means having different hermaphroditic faces. Alignment means associated with the adapter means is provided wherein the alignment means is interchangeable with other alignment means capable of holding the optical fibers in preselected positions relative to the mating end of the rigid terminating member. The modular connector also includes the one fiber optic cable having strength members to protect the optical fibers by resisting longitudinal and transverse loading with retainer means being associated with the terminating member for securing forward ends of the strength members against movement.

With these features of construction, the modular hermaphroditic connector may interchangeably utilize any adapter means having a hermaphroditic face. It may also utilize any alignment means capable of holding the optical fibers in preselected positions relative to the mating end of the rigid terminating member. Additionally, the modular hermaphroditic connector may utilize any retainer means capable of securing forward ends of the strength members against movement.

The present invention is therefore directed in its broadest sense to a hermaphroditic fiber optic connector for use in an assembly for aligning mating ends of at least one pair of optical fibers. This is accomplished in a device well suited for use as a multichannel connector exhibiting low loss characteristics for single fiber strengthened cables. The connector utilizes a hermaphroditic face making it possible to manufacture only a single form of connector rather than both male and female connectors almost universally utilized in the past thereby not only reducing manufacturing costs but also facilitating assembly in the field to reduce assembly costs as well. This is made possible since the hermaphroditic fiber optic connector is adapted for use in an assembly including a second identical hermaphroditic fiber optic connector. The connector is also suitably designed to permit utilization of a modular concept whereby individual operative elements are interchangeable with other like elements depending upon the particular application all of which are capable of concentrically aligning optical fibers in a highly accurate manner. This is accomplished using a surprisingly advantageous combination and arrangement of components. Other objects and advantages of the present invention will be appreciated from a consideration of the details of construction and operation set forth in the accompanying specification, claims and drawings.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings. In the drawings, like reference numerals identify like elements in the several figures in which:

DETAILED DESCRIPTION OF THE PREFERRED EMBODIMENT

Figure 1:
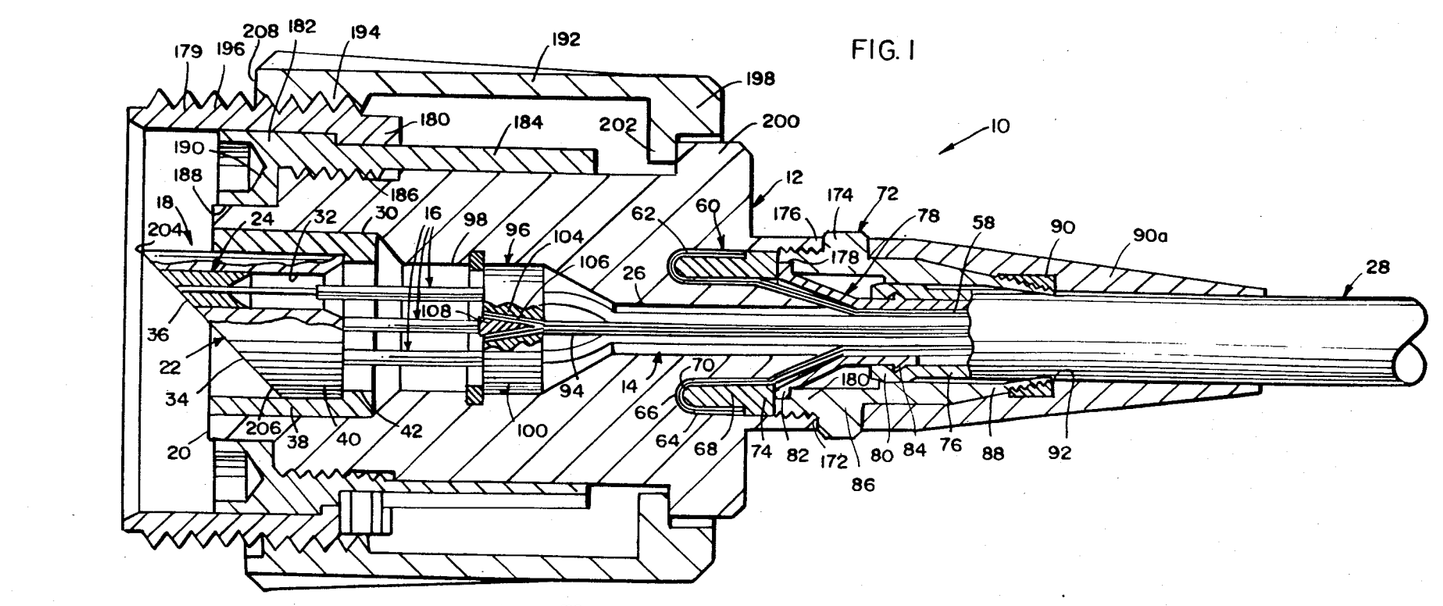
FIG. 1 is a cross-sectional view illustrating a hermaphroditic fiber optic connector constructed in accordance with the present invention.

In the illustration given and with reference first to FIG. 1, the reference numeral 10 designates generally a hermaphroditic fiber optic connector for use in an assembly for aligning mating ends of at least one pair of optical fibers in accordance with the present invention. The connector 10 includes a terminating member 12 having a passage 14 therein dimensioned for receiving one of the optical fibers 16. Adapter means 18 associated with a mating end 20 of the terminating member 12 and communicating with the passage 14 is provided wherein the adapter means 18 has a hermaphroditic face 22 exposed at the mating end 20 of the terminating member 12. The connector 10 also includes means 24 associated with the adapter means 18 for securing the one optical fiber 16 in a preselected position relative to the mating end 20 of the terminating member 12.

In a preferred embodiment, the hermaphroditic fiber optic connector 10 is adapted for use in an assembly including a second identical hermaphroditic fiber optic connector for aligning mating ends of optical fibers in a pair of fiber optic cables. The connector 10 then includes a rigid terminating member 12 having a first bore 26 dimensioned for receiving one of the fiber optic cables 28 and communicating with a second bore 30 in the mating end 20 of the rigid terminating member 12. The adapter means 18 is an adapter supported in the second bore 30 and having a plurality of spaced optical fiber receiving bores 32 for receiving the optical fibers 16 of the one fiber optic cable 28. The connector 10 again includes means 24 associated with the optical fiber receiving bores 32 for securing the optical fibers 16 in preselected positions relative to the mating end 20 of the rigid terminating member 12.

Additional features of the preferred embodiment include the second bore 30 being concentric with the first bore 26 and the first bore 26 being smaller in diameter than the diameter of the second bore 30. The first and second bores 26 and 30, respectively, extend longitudinally through the rigid terminating member 12. With this construction, the adapter 18 is cylindrical and has a diameter equal to the diameter of the second bore 30.

The hermaphroditic face 22 includes a planar surface disposed at an angle to a plane defined by the mating end 20 of the rigid terminating member 12. The planar surface 22 includes a first portion 34 recessed within the second bore 30 and a second portion 36 extending beyond the mating end 20 of the rigid terminating member 12. Preferably, the planar surface 22 is bisected by the plane defined by the mating end 20 of the rigid terminating member 12.

Considering the adapter 18 in greater detail, it includes a hollow sleeve 38 dimensioned to fit within the second bore 30 and supporting an insert 40 having the hermaphroditic face 22 formed on one end thereof. The sleeve 38 is cylindrical and has an outer diameter equal to the diameter of the second bore 30 and further has an inner diameter equal to the diameter of the insert 40. The adapter 18 also includes the sleeve 38 having an inwardly projecting lip 42 at the end thereof opposite the mating end 20 of the rigid terminating member 12 serving as a stop for the insert 40.

Figure 7:
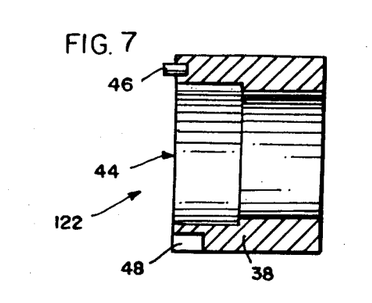
FIG. 7 is a cross-sectional view of still another form of adapter having a hermaphroditic face.

Referring to FIG. 7, a hermaphroditic face 44 may alternatively be utilized having a major planar surface which will lie in the plane defined by the mating end 20 of the rigid terminating member 12. The planar surface will then include means for aligning and constraining the hermaphroditic face 44 against longitudinal, transverse and rotational movement relative to a hermaphroditic face of a second identical hermaphroditic connector 10. The means for aligning and constraining the hermaphroditic face 44 includes a pin 46 and a pin receiving slot 48 spaced apart about the perimeter of the major planar surface.

Figure 6:
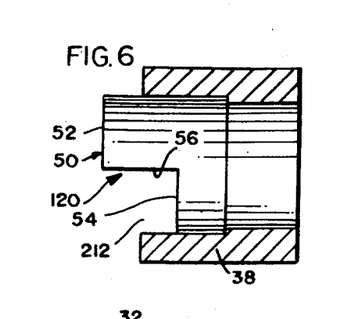
FIG. 6 is a cross-sectional view of another form of adapter having a hermaphroditic face.

Another suitable hermaphroditic face 50 includes first and second planar surfaces 52 and 54 (as shown in FIG. 6) lying in separate planes parallel to the plane defined by the mating end 20 of the rigid terminating member 12. One of the planar surfaces 52 lies in a plane set outwardly from the plane defined by the mating end 20 of the rigid terminating member 12 while the other of the planar surfaces 54 lies in a plane recessed within the second bore 30. The first and second planar surfaces 52 and 54, respectively, are joined by an alignment surface 56 lying in a plane generally perpendicular to the first and second planar surfaces 52 and 54.

Referring once again to FIG. 1, the one fiber optic cable 28 includes strength members 58 extending longitudinally of the optical fibers 16 about the periphery thereof to protect the optical fibers 16 by resisting longitudinal and transverse loading. The rigid terminating member 12 will then include strength member retainer means 60 for securing forward ends 62 of the strength members 58 against rearward movement relative to the rigid terminating member 12. The strength member retainer means 60 includes an annular groove 64 concentric with the first bore 26 and having a smoothly rounded inner end 66 wherein the groove 64 cooperates with an annular plug 68 having a smoothly rounded forward end 70 with the plug 68 tightly confining the forward ends 62 of the strength members 58 within the groove 64. The plug 68 is held within the groove 64 by releasable securing means 72 which engages the rearward end 74 of the plug 68 to urge the plug 68 further into the groove 64.

The one fiber optic cable 28 also includes an outer jacket 76 extending longitudinally of the strength members 58 about the periphery thereof to provide environmental protection for the optical fibers 16. The rigid terminating member 12 includes jacket retainer means 78 which is also associated with the releasable securing means 72 for securing a forward end 80 of the outer jacket 76 against rearward movement relative to the rigid terminating member 12. The outer jacket retainer means 78 is generally conical in shape having an outwardly extending circumferential rim 82 at one end and an outwardly projecting barb 84 at the other end with the rim 82 being confined between the plug 68 and the releasable securing means 72 and the barb 84 bitingly engaging the inner surface of the outer jacket 76.

The releasable securing means 72 is a hollow nut 86 threadingly engaged with the rigid terminating member 12 with the outer jacket 76 being confined between the inner surface of the hollow nut 86 and the outer surface of the outer jacket retainer means 78. The hollow nut 86 is externally threaded at the rearward end 88 thereof with the threads having longitudinally extending slots (not shown) to cooperate with an internally threaded nut 90 of decreasing diameter to compress the rearward end 88 thereof, the nut 90 being covered by a flexible boot 90a. With this construction, the compressed rearward end 88 of the hollow nut 86 acts as a second barb (as at 92) to bitingly engage the outer jacket 76 for securing the outer jacket 76 against forward movement relative to the rigid terminating member 12.

In addition to the strength members 58, the one fiber optic cable 28 may also include strength members 94 extending longitudinally of the optical fibers 16 through the center thereof in which case the rigid terminating member 12 will include means 96 for holding the strength members 94 against rearward movement relative to the rigid terminating member 12. The rigid terminating member 12 includes an intermediate bore 98 between the first and second bores 26 and 30, respectively, with the intermediate bore having a cylindrical plug 100 disposed therein having a plurality of circumferentially spaced slots 102 (as shown in FIGS. 3b and 4b) supporting the optical fibers 16 intermediate the first and second bores 26 and 30, respectively, in substantial alignment with the optical fiber receiving bores 32 in the adapter 18. The cylindrical plug 100 includes a tapered opening 104 through the center thereof (as shown in FIG. 1) receiving forward ends 106 of the strength members 94 and cooperating with a tapered plug 108 inserted therein to tightly confine the forward ends of the strength members 94 within the tapered opening 104.

Figures 8, 9:
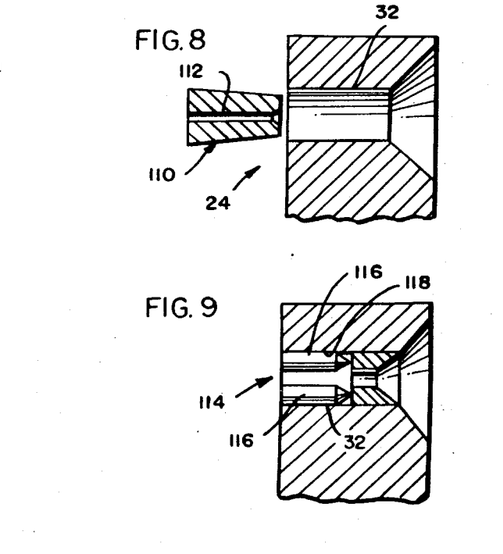
FIG. 8 is a cross-sectional view of one form of optical fiber securing means.
FIG. 9 is a cross-sectional view of another form of optical fiber securing means.
Figure 8A:
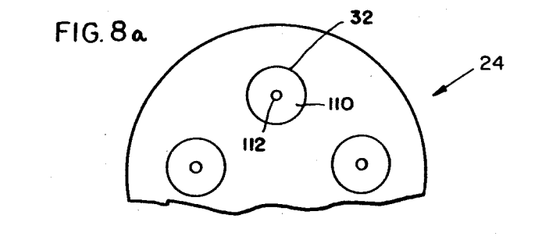
FIG. 8a is a partial schematic illustration of the form of optical fiber securing means illustrated in FIG. 8.

Referring to FIGS. 8 and 8a, the optical fiber securing means 24 includes compressible insert members 110 each having an outer dimension greater than the dimension of the optical fiber receiving bores 32 and a central aperture 112 dimensioned for receiving one of the optical fibers 16. It will be understood that one of the compressible insert members 110 is adapted for forced insertion into each of the optical fiber receiving bores 32. The compressible insert members 110 are substantially uniformly compressed by the optical fiber receiving bores 32 for substantially uniformly reducing the dimensions of the central apertures 112 about the optical fibers 16 to thereby tightly confine the optical fibers 16 in the preselected positions relative to the mating end 20 of the rigid terminating member 12.

Figure 9A:
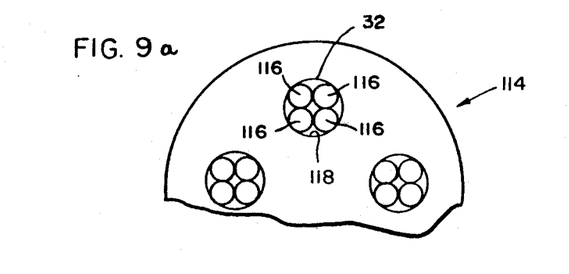
FIG. 9a is a partial schematic illustration of the form of optical fiber securing means illustrated in FIG. 9.

Referring to FIGS. 9 and 9a, alternative optical fiber securing means 114 is illustrated. The optical fiber securing means 114 includes a plurality of pin members 116 associated with each of the optical fiber receiving bores 32 in side-by-side relation. The pin members 116 are of equal dimension and dimensioned for substantially tangential contact with each other and with the inner walls 118 of each of the optical fiber receiving bores 32. The pin members 116 are also in substantial tangential contact with the optical fibers 16 for tightly confining the optical fibers 16 in the preselected positions relative to the mating end 20 of the rigid terminating member 12. Additionally, the alternative optical fiber securing means includes adhesive material (not shown) between the pin members 116 and the inner walls 118 of the optical fiber receiving bores 32 and between the pin members 116 and the outer surfaces of the optical fibers 16.

Utilizing the advantageous features disclosed above, a modular hermaphroditic connector for use in a fiber optic connector assembly for aligning mating ends of optical fibers in a pair of fiber optic cables is rendered possible. The connector 10 includes a rigid terminating member 12 having a first bore 26 dimensioned for receiving a fiber optic cable 28 and communicating with a second bore 30 in a mating end 20 of the rigid terminating member 12. Adapter means 18 is again associated with the second bore 30 having a hermaphroditic face 22 at the mating end 20 of the rigid terminating member 12 although the adapter means 18 is interchangeable with other adapter means (as shown in FIGS. 6 and 7) having different hermaphroditic faces. Alignment means 24 is also again associated with the adapter means 18 but the alignment means 24 is interchangeable with other alignment means (as shown in FIGS. 9 and 9a) capable of holding the optical fibers 16 in preselected positions relative to the mating end 20 of the rigid terminating member 12. The connector 10 also includes the fiber optic cable 28 having strength members 58 and 94 to protect the optical fiber 16 by resisting longitudinal and transverse loading together with retainer means 60 and 96 associated with the rigid terminating member 12 for securing forward ends 62 and 104 of the strength members 58 and 94 against movement. With these features of construction, the connector 10 is a modular hermaphroditic connector providing maximum versatility by utilizing components which are interchangeable depending upon the particular application.

More particularly, the modular hermaphroditic connector 10 is designed so that the adapter means 18 (FIG. 5) as well as the adapter means 120 (FIG. 6) and the adapter means 122 (FIG. 7) are mutually interchangeable for providing different hermaphroditic faces 22, 50 and 44, respectively. Similarly, the alignment means 24 (FIG. 8) as well as the alignment means 114 (FIG. 9) are mutually interchangeable for providing different means capable of securing the optical fibers 16 in preselected positions relative to the mating end 20 of the rigid terminating member 12. Additionally, the retainer means 60 (FIG. 1) and the retainer means 96 (FIG. 1) may be used together to secure forward ends 62 and 104, respectively, of the strength members 58 and 94 although they may also be used alternatively as well depending upon the type of fiber optic cable used in a manner to be described in greater detail hereinafter.

Figure 2:
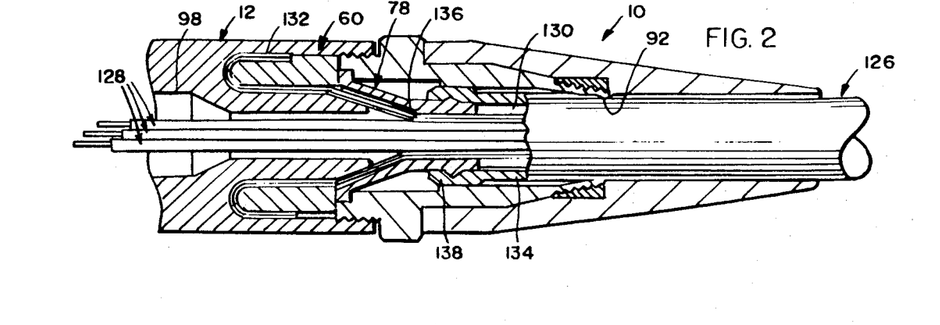
FIG. 2 is a cross-sectional view of the rear portion of a hermaphroditic fiber optic connector utilized with a fiber optic cable having only outer strength members.
Figure 2A:
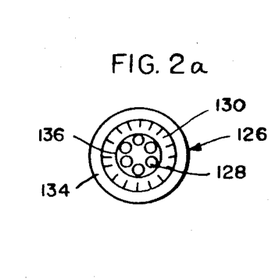
FIG. 2a is a cross-sectional view of a fiber optic cable having only outer strength members.

Referring to FIGS. 2 and 2a, a different fiber optic cable 126 may be used with the connector 10 of the present invention. It includes a plurality of optical fibers 128 extending longitudinally through the center thereof. Strength members 130 generally in the form of strands of high strength plastic are either braided or laid longitudinally over the optical fibers 128 to provide strength for the fiber optic cable 126 under longitudinal and transverse loading. It will be noted that the forward ends 132 of the strength members 130 are secured against rearward movement relative to the rigid terminating member 12 by retainer means 60. Outer jacket 134 as well as inner jacket 136 encase the strength members 130 and the optical fibers 128 within molded or extruded plastic to provide environmental protection. The forward end 138 of the outer jacket 134 is secured by jacket retainer means 78 and barb 92 against rearward and forward movement relative to the rigid terminating member 12. Optical fibers 128 extend through the intermediate bore 98 which need not have a cylindrical plug 100 inasmuch as there are no strength members extending through the center of the fiber optic cable 126.

Figure 3:
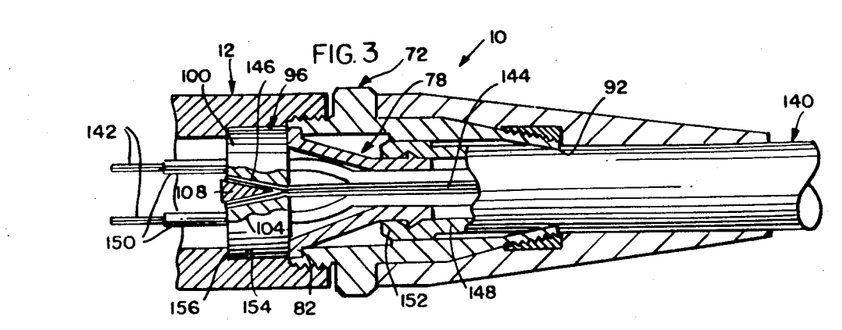
FIG. 3 is a cross-sectional view of the rear portion of a hermaphroditic fiber optic connector utilized with a fiber optic cable having only center strength members.
Figure 3A:
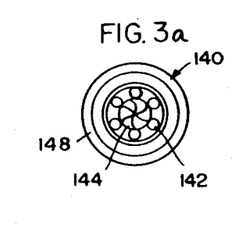
FIG. 3a is a cross-sectional view of a fiber optic cable having only center strength members.
Figure 3B:
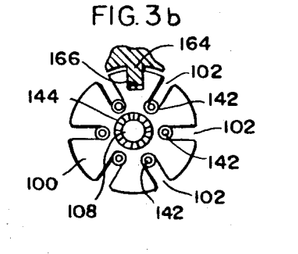
FIG. 3b is a cross-sectional view of retainer means for center strength members of a fiber optic cable in accordance with FIG. 3.

Referring to FIGS. 3 and 3a, a still different fiber optic cable 140 is utilized with the connector 10 of the present invention. It includes a plurality of optical fibers 142 extending longitudinally through the fiber optic cable 140 at an intermediate circumferential position. Strength members 144 again generally in the form of strands of high strength plastic are laid longitudinally through the center of the optical fibers 142 to provide strength for the fiber optic cable 140 under longitudinal or transverse loading. It will be noted that the forward ends 146 of the strength members 144 are secured against rearward movement relative to the rigid terminating member 12 by retainer means 96. Outer jacket 148 as well as the individual fiber jackets or insulation 150 encase the optical fibers 142 and the strength members 144 within molded or extruded plastic to provide environmental protection. The forward end 152 of the outer jacket 148 is secured by jacket retainer means 78 and the barb 92 against rearward and forward movement relative to the rigid terminating member 12. Optical fibers 142 extend through the slots 102 in the cylindrical plug 100 in substantial alignment with the optical fiber receiving bores in the adapter.

As shown in FIG. 3, the connector 10 can be altered somewhat for applications utilizing the fiber optic cable 140 since it is no longer necessary to include the retainer means 60. The intermediate bore 98 can be extended completely through the rigid terminating member 12 to cooperate with a counterbore 154 so as to define a shoulder 156. The cylindrical plug 100 can then be dimensioned to fit within the counterbore 154 and rest against the shoulder 156. It is contemplated that the connector 10 (as modified in FIG. 3) will be identical in all other respects to the connector 10 illustrated in the other views. The releasable securing means 72 will engage the outwardly extending circumferential rim 82 of the outer jacket retainer means 78 to urge the cylindrical plug 100 against the shoulder 156. The outer jacket retainer means 78 and the barb 92 will secure the forward end 152 of the outer jacket 148 against rearward and forward movement relative to the rigid terminating member 12. Of course, the tapered opening 104 in the cylindrical plug 100 cooperates with the tapered plug 108 inserted therein to tightly confine the forward ends 146 of the strength members 144 against rearward movement.

Figures 4, 4A:
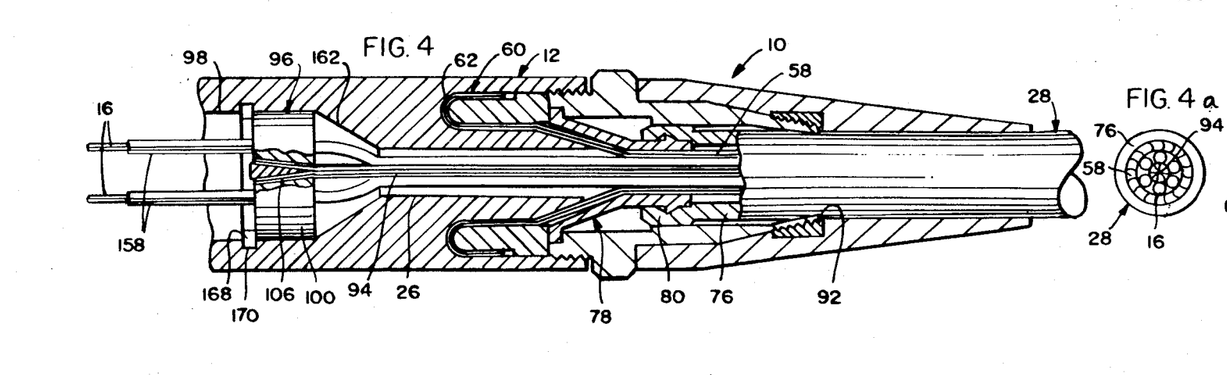
FIG. 4 is a cross-sectional view of the rear portion of a hermaphroditic fiber optic connector utilized with a fiber optic cable having both outer and center strength members.
FIG. 4a is a cross-sectional view of a fiber optic cable having both outer and center strength members.
Figure 4B:
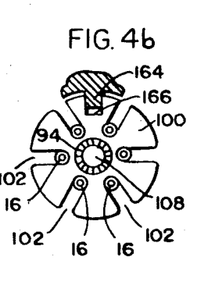
FIG. 4b is a cross-sectional view of retainer means for center strength members of a fiber optic cable in accordance with FIG. 4.

Referring to FIGS. 4 and 4a, the fiber optic cable 28 (also shown in FIG. 1) is utilized with the connector 10 of the present invention. It includes optical fibers 16 having an insulation covering 158 thereon extending longitudinally through the fiber optic cable 28 at an intermediate circumferential position. Strength members 58 generally in the form of strands of high strength plastic are either braided or laid longitudinally about the periphery of the optical fibers 16 to provide strength for the fiber optic cable 28 under longitudinal or transverse loading. It will be noted that the forward ends 62 of the strength members 58 are secured against rearward movement relative to the rigid terminating member 12 by retainer means 60. Strength members 94 also generally in the form of strands of high strength plastic are laid longitudinally through the center of the optical fibers 16 to provide additional strength for the fiber optic cable 28 under longitudinal or transverse loading. It will also be noted that the forward ends 106 of the strength members 94 are secured against rearward movement relative to the rigid terminating member 12 by retainer means 96. Outer jacket 76 as well as the individual fibers jackets or insulation 158 encase the strength members 58, optical fibers 16, and strength members 94 within molded or extruded plastic to provide environmental protection. The forward end 80 of the outer jacket 76 is secured by jacket retainer means 78 and the barb 92 against rearward and forward movement relative to the rigid terminating member 12. Optical fibers 16 extend through the circumferentially spaced slots 102 in the cylindrical plug 100 in substantial alignment with optical fiber receiving bores in the adapter. With these features of construction, it will be appreciated that the connector of the present invention is equally well suited for use with fiber optic cables having outer strength members (FIG. 2), center strength members (FIG. 3), or both center and outer strength members (FIG. 4).

As shown in FIGS. 4 and 4b, the cylindrical plug 100 is preferably held in position within the intermediate bore 98 by inserting it through the bore 98 until it reaches the transitional tapered bore 162 joining the intermediate bore 98 to the first bore 26. The transitional tapered bore 162 provides a stop for the cylindrical plug 100 by reason of its decreasing diameter. It will also be noted that the intermediate bore 98 includes a key 164 which may be aligned with a keyway 166 in the cylindrical plug in order to properly orient the cylindrical plug 100 and to constrain it against rotational movement relative to the rigid terminating member 12. The cylindrical plug 100 is also constrained against longitudinal movement relative to the rigid terminating member 12 by use of a snap ring 168 which may be inserted into an annular groove 170 in the intermediate bore 98 to hold the cylindrical plug 100 against the stop defined by the tapered transitional bore 162. Referring to FIGS. 3 and 3b, it will be appreciated that the cylindrical plug 100 again utilizes the key 164 and keyway 166 for proper orientation and constraint against relative rotational movement although the snap ring 168 and annular groove 170 are not required since the shoulder 156 provides longitudinal constraint in this embodiment.

Referring again to FIG. 1, still additional details of construction can be appreciated. The rigid terminating member 12 includes an internally threaded ring 172 integral therewith extending rearwardly from the rearward end thereof. The internally threaded ring 172 cooperates with external threads on the hollow nut 86 and an oversized annular flange 174 on the hollow nut 86 cooperates with the end 176 of the ring 172 to act as a stop. The oversized annular flange 174 also serves as a stop relative to the boot 90a. Finally, the hollow nut 86 includes an annular groove 178 in its forward end 180 into which the outwardly extending circumferential rim 82 of the jacket retainer means 78 fits whereby the hollow nut 86 engages the rearward end of the annular plug 68 both directly and indirectly through the rim 82 to urge the plug 68 further into the groove 64.

As previously mentioned, the connector 10 of the present invention is adapted for use in an assembly including a second identical connector for aligning mating ends of at least one pair of optical fibers. This can be accomplished by utilizing a threaded sleeve 179 having a reduced diameter portion 180 which cooperates with an enlarged diameter portion 182 of a threaded fitting 184. The threaded fitting 184 cooperates with threads 186 on the outer surface of the rigid terminating member 12 near the mating end 20 thereof and just rearwardly of an annularly cut away portion 188 into which a reduced diameter portion 190 of the fitting 184 fits. The annular sleeve 179 is then held in position with the reduced diameter portion 180 in firm engagement with the enlarged diameter portion 182 of the fitting 184 by means of threaded coupling 192. The coupling 192 is an oversized annular ring having internal threads 194 adapted to cooperate with external threads 196 on the sleeve 179. The rearward end 198 of the coupling 192 includes an L-shaped collar adapted to cooperate with an annular shoulder 200 on the rigid terminating member 12. As will be appreciated, the sleeve 179 can be advanced forward relative to the coupling 192 until the reduced diameter portion 180 is in firm engagement with the enlarged diameter portion 182 of the fitting 184 and the portion 202 of the L-shaped collar 198 is in firm engagement with the annular shoulder 200 of the rigid terminating member 12.

When the connector 10 is so assembled, a second identical connector 10 can be used with it for aligning mating ends of at least one pair of optical fibers by axially aligning and moving the connectors 10 toward one another 180° out of phase. It will be appreciated that the outer extremity 204 of the hermaphroditic face 22 of the connector 10 will then be in alignment with the inner extremity 206 of the hermaphroditic face 22 of the second identical connector 10 (not shown), and the connectors 10 may be advanced toward one another until they are in firm engagement with the hermaphroditic faces 22 of the adapters 18 suitably arranged for aligning the optical fibers 16. As this is being done, the coupling 192 of the second identical connector 10 will be threadingly engaged with the remaining portion of the threads 196 on the sleeve 179 after which the ends 208 of the couplers 192 will be in contact to complete the assembly comprised of the two identical connectors 10.

Figure 5:
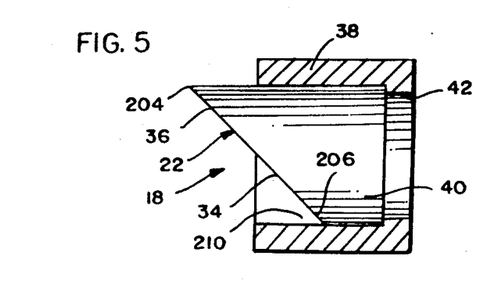
FIG. 5 is a cross-sectional view of one form of adapter having a hermaphroditic face.

Referring to FIGS. 5 through 7, it will be appreciated how the adapters 18, 120 and 122 all assure precise alignment of optical fibers with the use of hermaphroditic faces. The outer extremity 204 of the hermaphroditic face 22 (as shown in FIG. 5) locates into the corner 20 defined by the inner extremity 206 and the hollow sleeve 38 of a second identical hermaphroditic face 22 and it is prevented from overexcursion by reason of the nesting of the outer extremity 204 in the corner 210. The geometry of the adapter 18 is such that the hermaphroditic faces 22 are also prevented from relative movement. The first planar surface 52 of the hermaphroditic face 50 (as shown in FIG. 6) locates into a recess 212 defined by the second planar surface 54, the alignment surface 56, and the hollow sleeve 38 of a second identical hermaphroditic face 50 and it is prevented from misalignment by reason of the nesting of the first planar surface 52 within the recess 212. The geometry of the adapter 120 is also such that the hermaphroditic faces 50 are prevented from relative movement. The pin 46 and the pin receiving slot 48 adjacent the hermaphroditic face 44 (as shown in FIG. 7) mate, respectively, with a second identical pin receiving slot and pin and the hermaphroditic faces 44 are prevented from misalignment thereby. The geometry of the adapter 122 is also such that the hermaphroditic faces 44 are prevented from relative movement. While three specific forms of hermaphroditic faces and adapters have been illustrated, it is apparent that still other adapters will be suitable for use in the inventive connector in a manner also providing three axes of alignment considering the advantageous modular design.

Referring to the insert termination concepts illustrated in FIGS. 8, 8a, 9 and 9a, these have previously been described in considerable detail in commonly assigned U.S. Pat. Nos. 4,183,619 and 4,190,317 The concept disclosing utilization of a compressible insert member (FIGS. 8 and 8a) is generally considered an epoxyless method whereas the concept utilizing a plurality of pin members (FIGS. 9 and 9a) is generally described as an epoxy method. While these features have generally been described hereinabove for purposes of understanding their use in the present invention, the disclosure of the referenced applications is incorporated herein by reference to a more complete description of these insert termination concepts.

With the above features of construction, the connector 10 clearly represents a significant advancement in the art of fiber optic connectors. It permits the use of a hermaphroditic connector in an assembly including a second identical hermaphroditic connector for aligning mating ends of at least one pair of optical fibers in a pair of fiber optic cables. The connector 10 is well suited for use as a multichannel low loss connector for single-fiber-per-channel fiber optic cables. It provides strain relief for the jacketing or strength members of a fiber optic cable to protect the optical fibers from strain or breakage. Still additionally, the connector 10 provides an overall structure capable of achieving all of these advantages which will accept variations in fiber optic cable design by utilizing a modular concept.

With the connector of the present invention, it is possible to provide maximum versatility in a simple, yet reliable device. The nature of the construction makes it possible to utilize any of at least three different rear cable retention schemes with any of at least three different front fiber alignment schemes which in turn can be used with either of at least two different fiber terminating concepts. The connector of the present invention clearly incorporates a multitude of features within a single device in various combinations capable of accomplishing the objective of providing a modular hermaphroditic fiber optic connector.

While in the foregoing specification a detailed description of the inventive concepts have been set forth for purposes of illustration, the details herein given may be varied by those skilled in the art without departing from the spirit and scope of the invention set forth in the appended claims.

We claim:

1. A retainer member for securing strength members extending longitudinally through the center of a plurality of optical fibers in a fiber optic cable against rearward movement in a bore within a fiber optic connector comprising:

a supporting member disposed within said bore, said supporting member having a plurality of spaced slots supporting said optical fibers in said bore within said fiber optic connector, said supporting member having an opening extending therethrough for receiving forward ends of said strength members; and a confining member adapted for insertion into said opening in said supporting member to tightly confine said forward ends of said strength members against rearward movement in said bore within said fiber optic connector.

2. The retainer member of claim 1 wherein said supporting member is a cylindrical plug, said opening extending through said supporting member is a tapered opening in the center thereof, said slots in said supporting member are spaced circumferentially, and said confining member is a tapered plug.

* * * * *